(12) United States Patent  (10) Patent No.: US 6,404,800 B1
Fuchs  (45) Date of Patent: Jun. 11, 2002

(54) CHARGING MATERIAL PREHEATER WITH REPLACEABLE SHAFT WALL PORTIONS

(75) Inventor: Gerhard Fuchs, Kehl-Bodersweier (DE)

(73) Assignee: Arcmet Technologie GmbH, Linz (AT)

( * ) Notice: Subject to any disclaimer, the term of this patent is extended or adjusted under 35 U.S.C. 154(b) by 0 days.

(21) Appl. No.: 09/622,797

(22) PCT Filed: Feb. 19, 1999

(86) PCT No.: PCT/EP99/01101

§ 371 (c)(1),
(2), (4) Date: Nov. 13, 2000

(87) PCT Pub. No.: WO99/42625

PCT Pub. Date: Aug. 26, 1999

(30) Foreign Application Priority Data

Feb. 23, 1998 (DE) .......................................... 198 07 590

(51) Int. Cl.[7] ............................................... F27D 13/00
(52) U.S. Cl. ............................................ 373/80; 373/71
(58) Field of Search .............................. 373/2, 8, 9, 60, 373/63, 71, 73, 77, 78–81, 83–85

(56) References Cited

U.S. PATENT DOCUMENTS 1,849,658 A  3/1932 Brassert 3,543,955 A  12/1970  Shekels ........................ 214/21

FOREIGN PATENT DOCUMENTS

| CH | 3 70 878 | 9/1963 |
| DE | 37 13 369 | 11/1988 |
| DE | 39 40 558 | 6/1991 |
| WO | WO 90/10086 | 9/1990 |
| WO | WO 95/04910 | 2/1995 |
| WO | WO 96/00877 | 1/1996 |

OTHER PUBLICATIONS

International Search Report completed on Jun. 22, 1999 and mailed on Jul. 6, 1999.

German Search Report, 1998.

*Primary Examiner*—Tu Ba Hoang
(74) *Attorney, Agent, or Firm*—Foley, Hoag & Eliot LLP

(57) ABSTRACT

In a charging material preheater for preheating charging material (60) which is to be charged into a furnace vessel (3), having a shaft (9) which is fixed in a frame structure (20) and which in its upper region has a closeable feed opening (61) for the charging material (60) and a gas outlet and in its lower region a discharge opening for the charging material (60) and a gas inlet, and whose shaft walls (33, 35) delimit a receiving space (62) for the charging material (60) to be heated, the shaft walls (34, 35) are subdivided into shaft wall portions which are individually replaceably fixed in the frame structure (20).

17 Claims, 8 Drawing Sheets

CHARGING MATERIAL PREHEATER WITH REPLACEABLE SHAFT WALL PORTIONS

TECHNICAL FIELD

The invention concerns a charging material preheater for preheating charging material which is to be charged into a furnace vessel. As set forth in the classifying portion of claim 1.

STATE OF THE ART

A charging material preheater of that kind is described for example in WO-A1-95/04910. An advantageous use of a charging material preheater of the general kind set forth is described in WO-A-90/10086. Here, an outer segment of the vessel cover of an arc furnace is replaced by a shaft which is fixed in a holding structure and through which the hot furnace gases can be passed. In heat-exchange relationship, they heat the charging material which is disposed in the shaft, and make it possible to achieve a substantial energy saving. The cross-section of the charging material preheater in shaft form can be round or oval with a single shaft wall. Preferably it is of quadrangular, that is to say polygonal cross-section, so that the receiving space for the charging material to be heated is defined by four shaft walls.

The shaft wall or the shaft walls of known charging material preheaters are either formed from refractory material such as refractory bricks a refractory spray material or a refractory casting material or however from water-cooled steel wall elements, preferably in the form of tubular panels.

If the shaft walls, on the inward side that is towards the internal space of the charging material preheater, comprise refractory material. then, when a mechanical loading is involved as occurs when the shaft is loaded, that inward side is subjected to a greater degree of wear and the risk of a higher level of damage than water-cooled steel wall elements. For that reason, and also for reasons of weight, operators have changed over to making the shaft walls in the form of fluid-cooled steel walls, in particular in the form of tubular panels which can be connected to a cooling circuit.

As already mentioned, the insides of the shaft walls, in the loading operation involving charging material, are exposed to high levels of mechanical loading, in particular when heavy scrap is also used as the charging material. If the heavy scrap contains for example railway rails which have been cut and broken up into pieces, the sharp edges of such rail pieces, upon being emptied into the shaft from a charging basket which is moved into a position above the upper loading opening of the shaft, break relatively large pieces out of the inside of the wall, in the case of a shaft wall comprising,refractory material. Even in the case of tubular panels which have a substantially higher level of mechanical load-bearing capability, serious damage such as leaks can occur due to such loadings.

Although basically the risk of damage to the inside of the shaft walls is greater in the lower region of the shaft than in the upper region, because in the lower region the kinetic energy of the pieces of scrap which are falling from above into the shaft is greater, it is not specifically possible to predetermine at what locations damage which has to be repaired will occur in operation, so that it is also not possible to obviate the need for local repair to the inside of the shaft wall by virtue of precautionary strengthening at such locations.

If a repair becomes necessary, that involves relatively long stoppage times for the charging material preheater, particularly in the case of refractory walls, because of the necessary cooling-down time. In addition, eliminating leaks in the case of water-cooled walls requires unacceptably long stoppage times because of the need to shut down the water circuit and because of the necessary welding operations.

If fluid-cooled steel walls which can withstand a mechanically higher loading are used, that involves energy losses, in comparison with walls in which the inside has a refractory cladding. For shaft cooling of a medium-size furnace, about 700 $m^3$ of cooling water per hour is required. On average the cooling water is heated by 5° C. to 6° C. It can be deduced therefrom that, with 75 t of liquid steel which are produced in 45 minutes, the average energy loss in the cooling water is about 3360 kWh, that is to say about 45 kWh per tonne of liquid steel. In regard to a reduction in the level of energy losses, it would be desirable to replace the more robust fluid-cooled steel walls by shaft walls of refractory material. The obstacle to that is a greater susceptibility to repair and longer stoppage times.

U.S. Pat. No. 3,632,094 A discloses a charging material preheater comprising two shaft-form units which are of a similar structure and which can be fixed on both sides and symmetrically to a central portion which has a gas-permeable separating wall and which is rotatable through 180°. To reduce the amount of wear and abrasion, that arrangement is intended to ensure that the charging material does not have to be moved from a charging opening present in the upper region through the entire shaft to a discharge opening in the lower region of the shaft, as in the case of the charging material preheater as set forth in the classifying portion of claim 1, and this arrangement provides that different kinds of charging material can be heated in two stages in the two portions, before the charging material is transported to the smelting vessel and charged therein.

For operation of the known charging material preheater, it is necessary for the arrangement to have a central portion which is rotatable through 180°, with a gas-permeable separating wall, and a device which after emptying of the unit performs the rotary movement. Having regard to the high level of mechanical loading involved in the rotational procedure, the known charging material preheater is only suitable for preheating relatively small amounts of charging material.

STATEMENT OF THE INVENTION

The object of the invention is to reduce the repair and stoppage times in a charging material preheater and therewith also tee costs in regard to local damage requiring repair at the inside of the shaft, in particular in relation to shaft walls of refractory material. The invention further seeks to provide that the energy losses are reduced in comparison with a shaft comprising fluid-cooled steel walls.

That object is attained by the present invention. Advantageous configurations of the invention are to be found in the preferred embodiments of the invention.

In the charging material preheater according to the invention the shaft wall or, when the shaft is of a polygonal cross-section, the individual shaft walls, is or are subdivided into shaft wall portions which are individually replaceably fixed in a frame structure. That makes is possible on the one hand for the shaft, at the inside at individual locations at which a lower level of mechanical loading is to be expected, in particular in the upper region, to be lined with refractory material or to be formed from refractory plates, while more robust steel wall elements are used at locations which are subjected to more, severe loadings. On the other hand, it permits damaged shaft wall portions to be rapidly changed, irrespective of whether this involves a shaft wall portion of refractory material, that is in need of repair, or a leaking tubular panel. Preferably, in regard to the aspect of storage of replacement shaft wall portions, they are of such dimensions that the number of different sizes is minimized.

Shaft wall portions that have proven to be particularly advantageous are those which, at their outside, have support surfaces with which they bear against corresponding co-operating counterpart mountings of the frame structure, when they are fitted into the frame structure. The frame structure is preferably mounted in such a way that it can be raised and lowered in a holding arrangement, by means of which the shaft can be pivoted or moved to the side from a position above a furnace vessel. If a damaged shaft wall portion has to be replaced, then the shaft is moved to the side out of the operating position above the furnace vessel and the damaged shaft wall portion is replaced by a new or repaired one. After the shaft has been moved back again, the charging material preheater is again ready for operation.

Shaft wall portions comprising fluid-cooled steel wall elements are to be capable of being individually taken out of the cooling circuit, to speed up the replacement operation.

BRIEF DESCRIPTION OF THE DRAWINGS

The invention will be described in greater detail by means of an embodiment with reference to nine Figures of drawings. The specific embodiment describes the use of the charging material preheater in accordance with the invention in a modified arc furnace with a round lower vessel portion in which the space conditions for the shaft which is to be arranged beside the electrodes are limited, whereby the retaining members in the shaft are so designed that when the shaft is filled, the wall at the electrode side is exposed to particularly high levels of mechanical loading.

In the diagrammatic drawing.

DETAILED DESCRIPTION OF THE DRAWINGS

Figure 1:
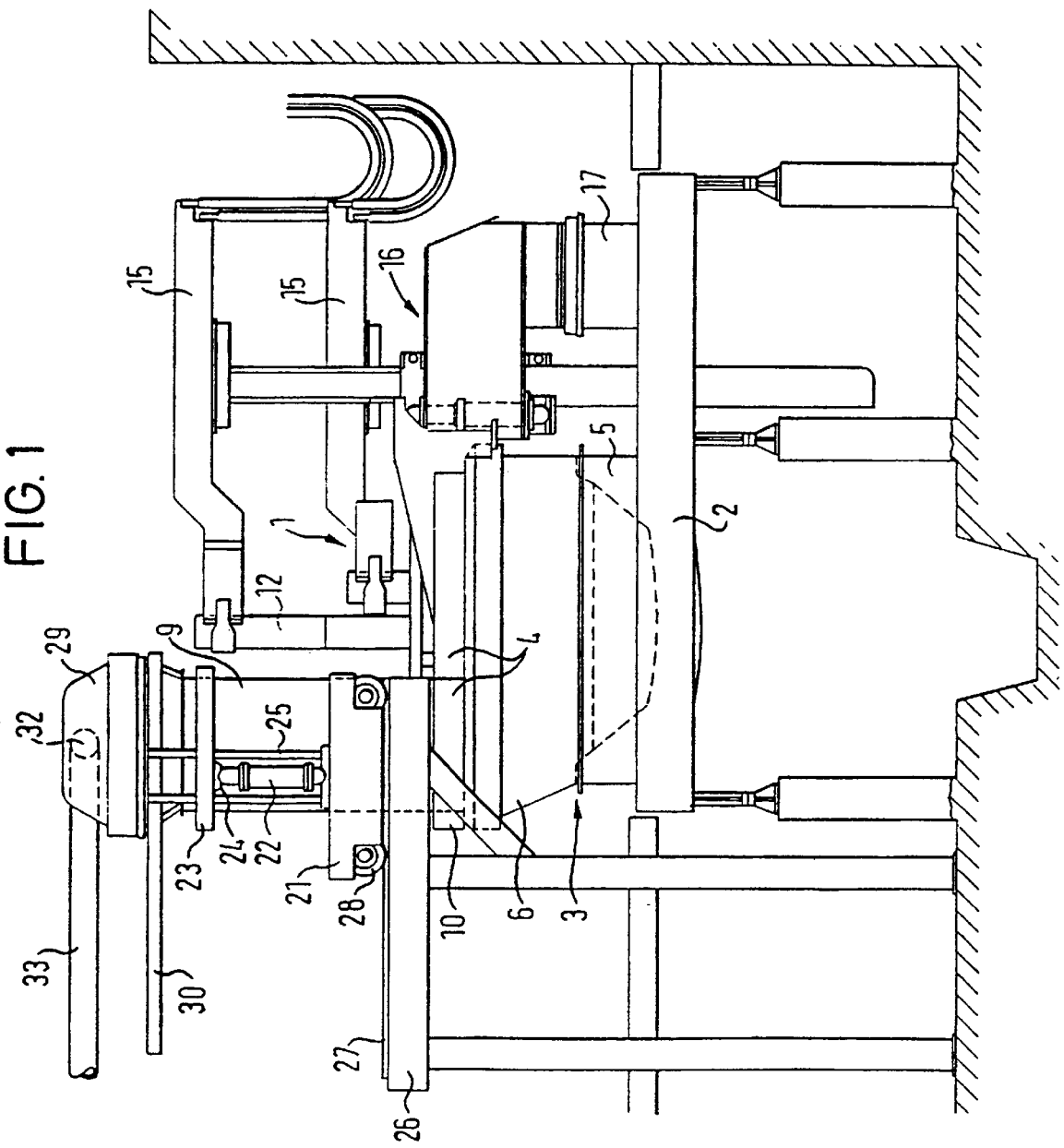
FIG. 1 shows a smelting unit comprising an arc furnace and a charging material preheater which is disposed laterally beside the electrodes, with the vessel cover closed.
Figure 2:
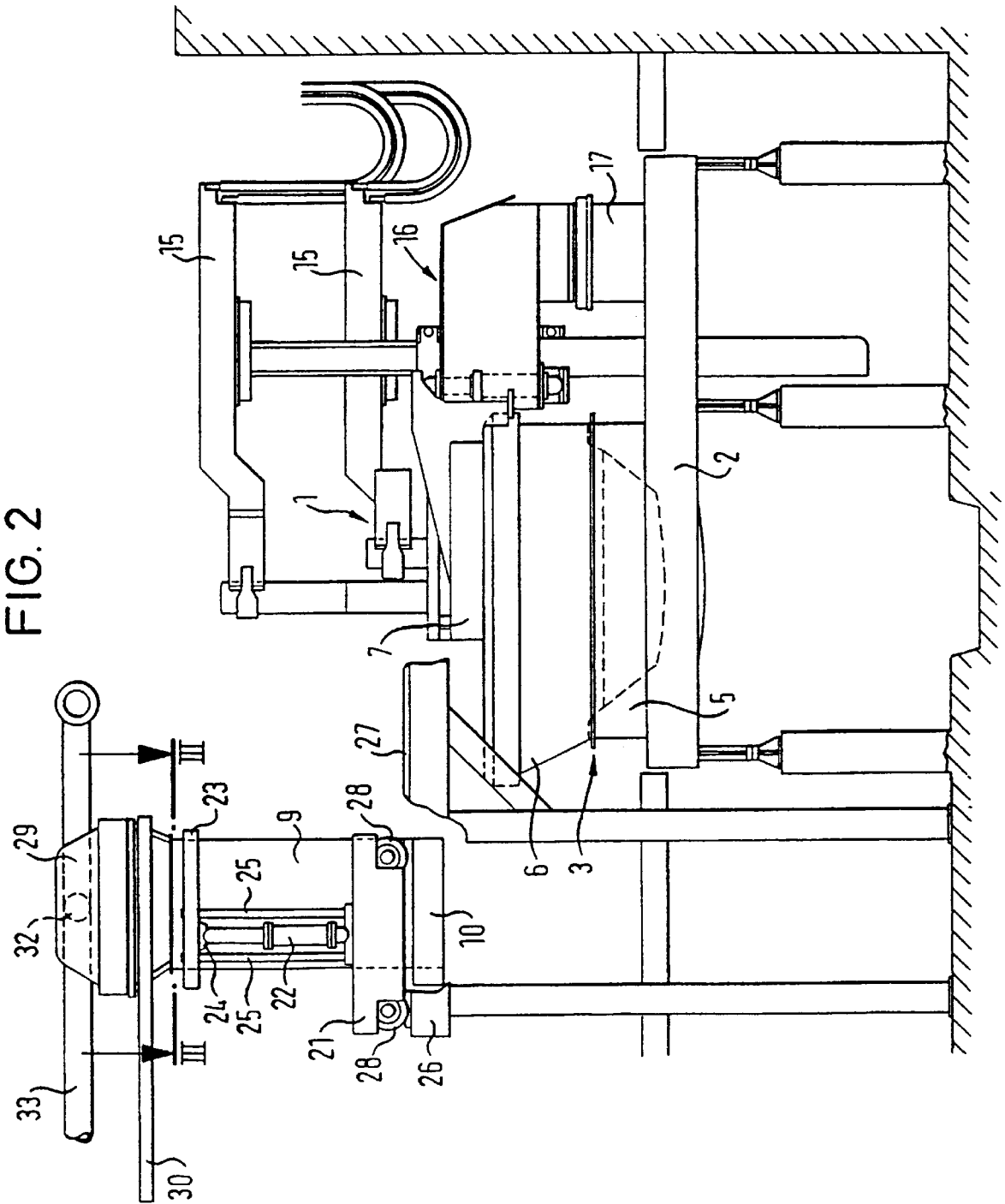
FIG. 2 shows the FIG. 1 unit with the shaft removed.

The smelting unit illustrated in FIGS. 1 to 5 includes an arc furnace 1 with a furnace vessel 3 mounted on a furnace cradle 2, and a vessel cover 4 of an arch-like shape which covers the upper edge of the furnace vessel. The furnace vessel 3 comprises a lower vessel portion 5 which forms the brick-lined furnace hearth for receiving the molten metal, and an upper vessel portion 6 which is usually formed from water-cooled elements. As can be seen in particular from FIGS. 3 to 5, the vessel cover 4 comprises a first cover portion 7 which is shown in the outwardly pivoted position in FIG. 3, and a second cover portion 8 which is substantially formed by the lower end portion of a shaft 9 or a frame 10 accommodating the lower portion of the shaft 9 (FIGS. 1 and 2). In FIG. 1 the two-part vessel cover is closed, in FIG. 2 the second cover portion including the shaft 9 is extended.

Figure 3:
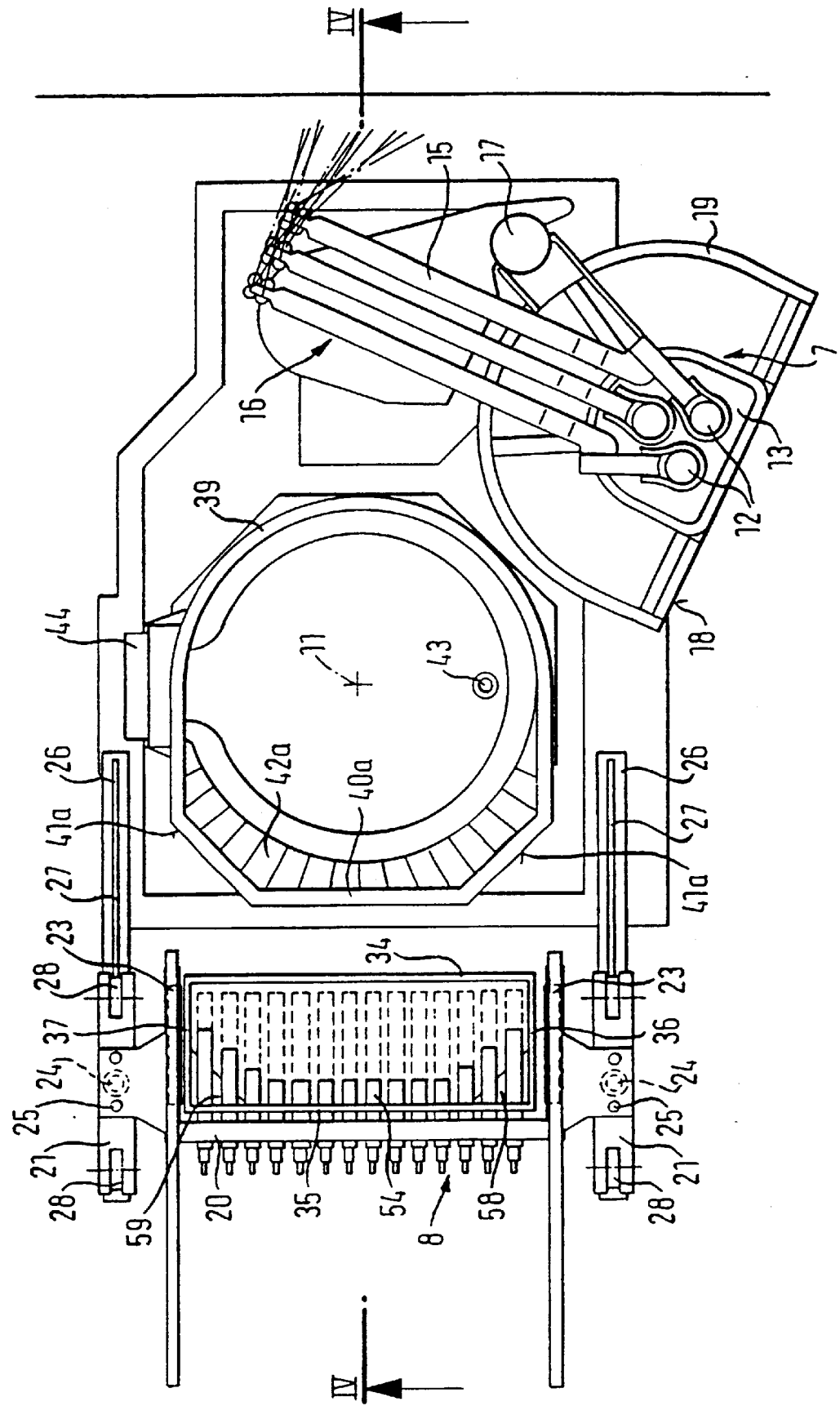
FIG. 3 shows a plan view of the smelting unit with the section III—III of the shaft, as shown in FIG. 2.
Figure 4:
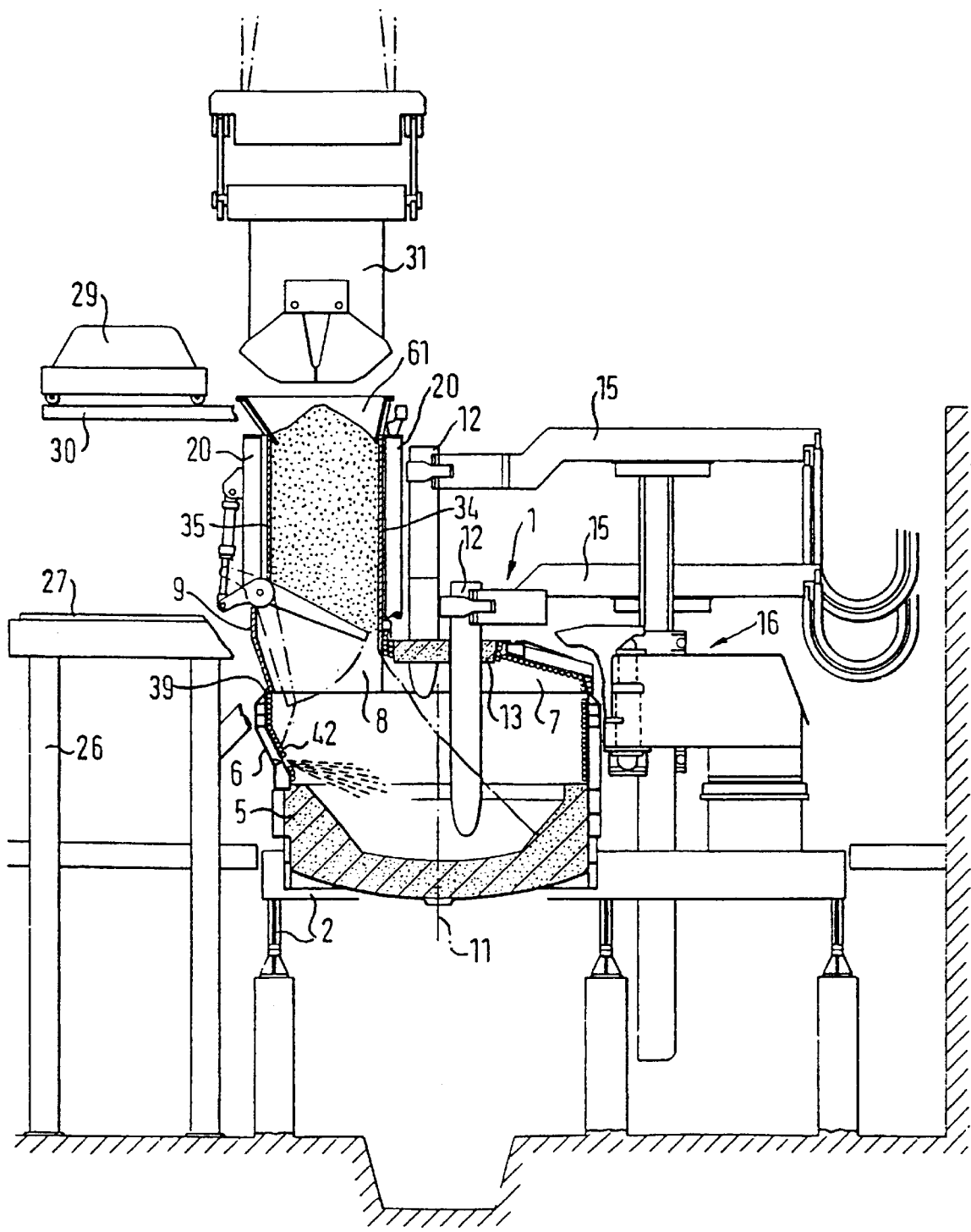
FIG. 4 shows the section IV—IV in FIG. 3 with the shaft arranged over the furnace vessel.
Figure 5:
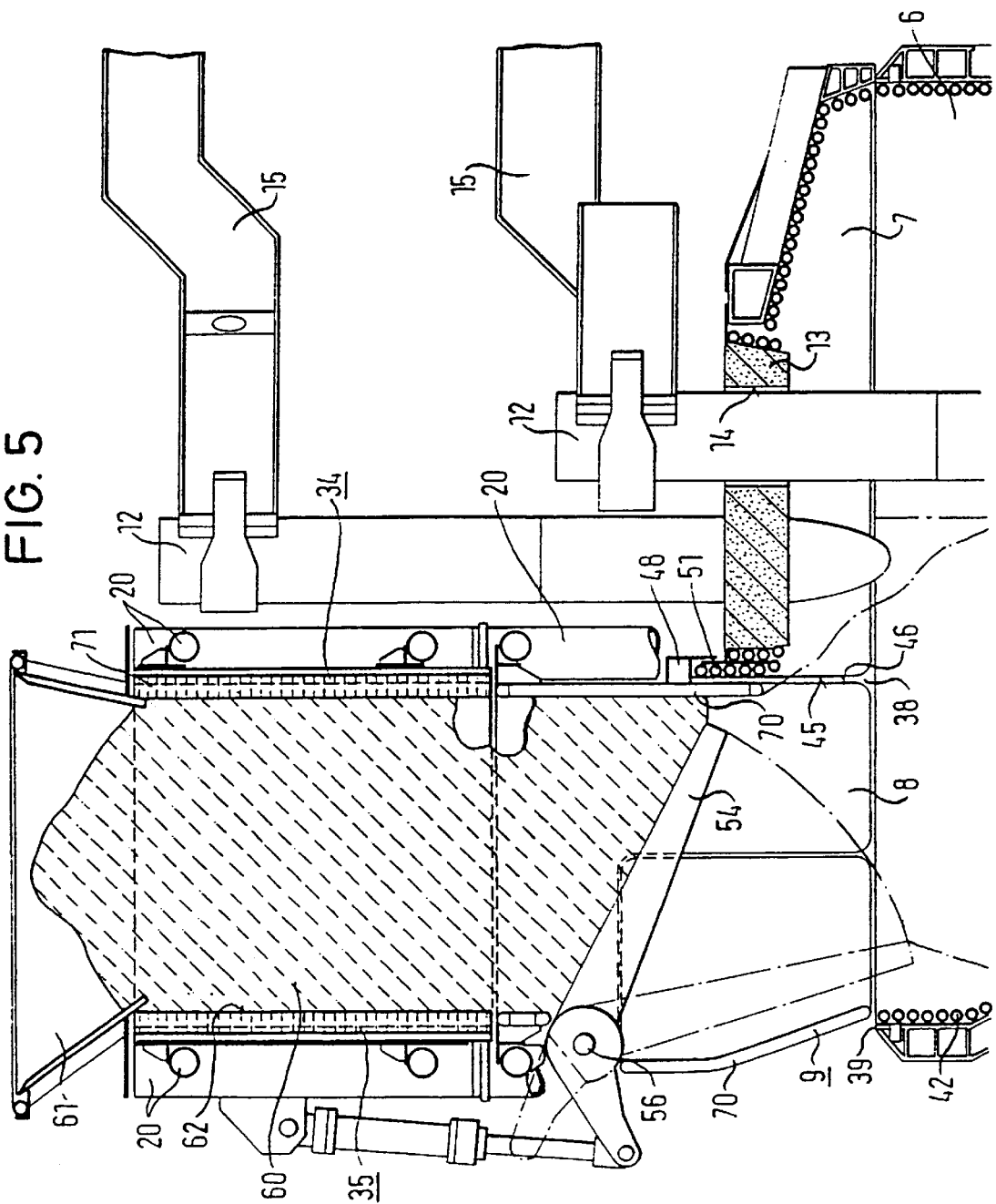
FIG. 5 shows a part on an enlarged scale of FIG. 4.

As shown in particular by FIGS. 3 to 5, the part shown in the drawings to the right of the center of the furnace vessel corresponds to a conventional arc furnace with a round furnace vessel and electrodes 12 which can be moved into the furnace vessel concentrically with respect to the vessel center 11 (central axis of the vessel, see FIGS. 3 and 4). Only the region illustrated in the drawings to the left of the electrodes 12 is modified above the lower vessel portion, in comparison with the usual configuration of an arc furnace with a round vessel shape.

The first cover portion 7 is of an arch-like configuration and has a so-called cover heart or core portion 13 with electrode openings 14 (FIG. 5) for three electrodes 12 which are to be introduced into the vessel, in the usual triangular arrangement of a three-phase arc furnace. The electrodes 12 are mounted to electrode carrier arms 15 and can be raised/lowered and pivoted to the side by means of an electrode lifting and pivoting arrangement 16. The first cover portion 7 can be lifted by means of a cover lifting and pivoting arrangement 17 from the position shown in FIGS. 4 and 5 in which it lies on the edge of the vessel, and can be pivoted to the side into the position shown in FIG. 3 in order to open the furnace vessel for example for a basket charging operation from above. A suitable cover lifting and pivoting arrangement is described for example in EP-0 203 339.

In the illustrated embodiment not only the furnace vessel 3 but also the cover lifting and pivoting arrangement 17 and the electrode lifting and pivoting arrangement 16 are fitted onto the furnace cradle 2 so that the furnace vessel can be tilted jointly with the electrodes.

So that the electrode arrangement does not have to be changed in a conversion or modification operation, the construction illustrated provides that the first cover portion is in the form of an oval 19 which is defined by a chord 18 and which includes the usual electrode configuration. When the first cover portion is fitted on the furnace vessel, the chord must lie in the tilting direction, that is to say perpendicularly to the plane of the paper in the view shown in FIG. 2. In that way, the furnace vessel can be tilted for the tapping-off operation or the slag removal operation, with the cover portion 7 closed and without displacement of the cover portion 8. In that situation, the shaft 9 only has to be slightly lifted. In that way the heat losses due to radiation are reduced or the hot furnace gases pass for the major part into the preheating shaft. Possibly, the gap which occurs when the shaft 9 is raised between the lower edge of the shaft or the second cover portion 8 and the vessel edge (39 in FIG. 5) can be sealed off by means of an apron or other means which are mounted to the shaft or to the vessel edge.

The shaft 9 is fixed in a frame structure 20 which encloses the shaft 9 in the manner of a cage, the frame 10 illustrated in FIGS. 1 and 2 of the second cover portion 8 representing a part of the frame structure. The frame structure 20 which is illustrated in greater detail in FIGS. 5 to 9 and which carries the shaft 9 is mounted in a holding arrangement 21 (see FIGS. 1 to 3) in such a way that the frame structure 20 can be raised and lowered jointly with the shaft by means of a lifting arrangement 22. For that purpose, provided on transverse beam members 23 of the frame structure are engagement locations 24 for the lift arrangements 22 which are supported on the holding arrangement 21 so that the, transverse beam member 23 and therewith the frame structure 20 carrying the shaft can be lifted out of the lower position shown in FIG. 1 into the upper position shown in FIG. 2. In that case, the required guidance effect is ensured by guide bars 25.

The holding arrangement 21 with shaft 9 is horizontally displaceable. For that purpose, rails 27 are provided on a support structure 26 and the holding arrangement 21 is provided with wheels 28 which permit displacement of the holding arrangement 21 in the horizontal direction.

The shaft 9 can be closed at the top by means of a shaft cover 29 which, in the illustrated embodiment, is displaceable horizontally on rails in order to open the upper charging opening 61 for charging by means of a charging basket 31 (FIG. 4) transported by a crane. On the side which is the rear side in FIG. 1, the shaft cover 29 which is of a cap-like or dome-like configuration has a gas passage opening 32 connected to a waste gas conduit 33 when the shaft 9 and therewith the frame 10 are in the position shown in FIG. 1.

Figure 8:
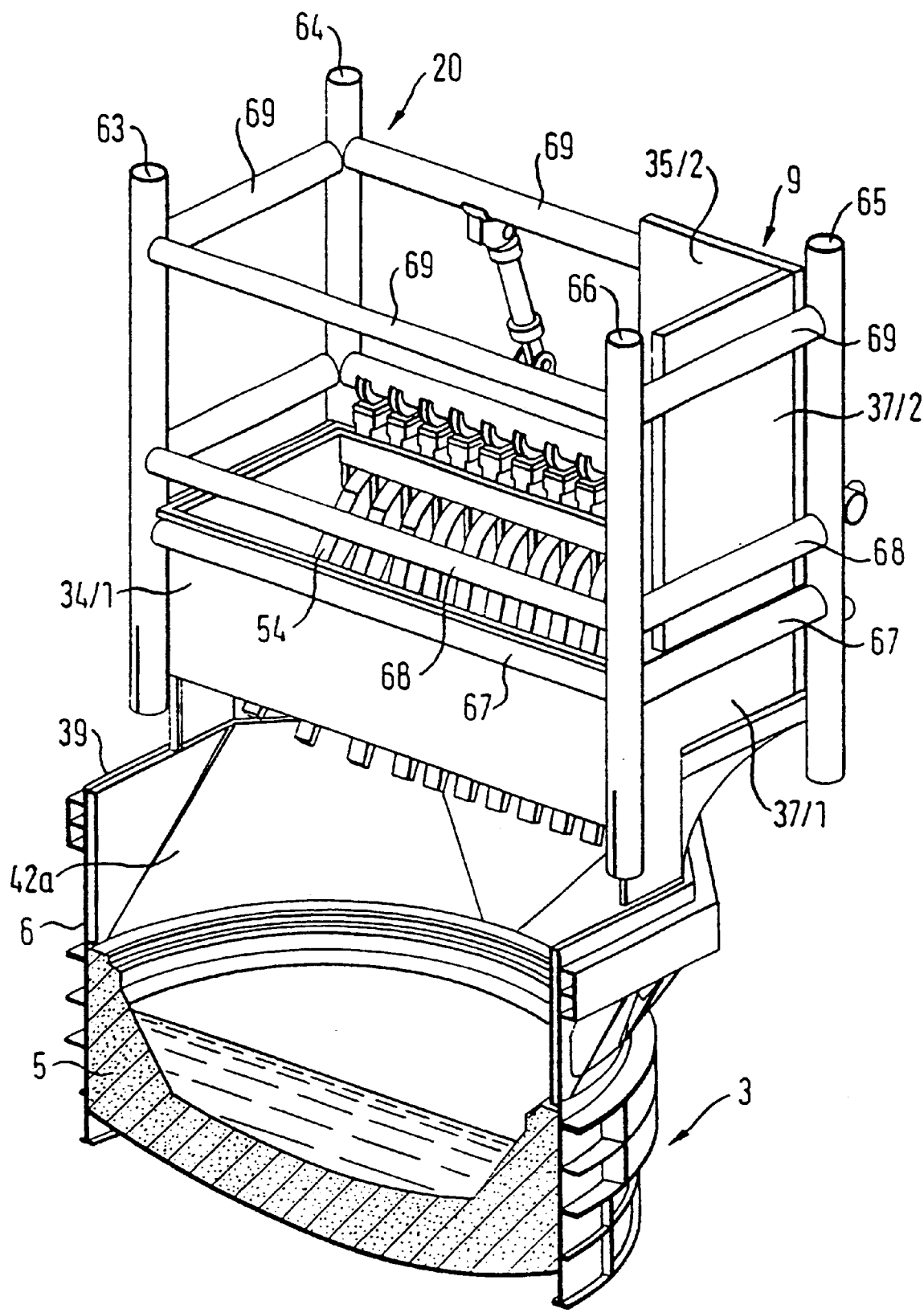
FIG. 8 and FIG. 9 are each partly sectional, highly diagrammatic perspective views of the parts, which are relevant to understand the arrangement, of the shaft disposed above a furnace vessel.
Figure 9:
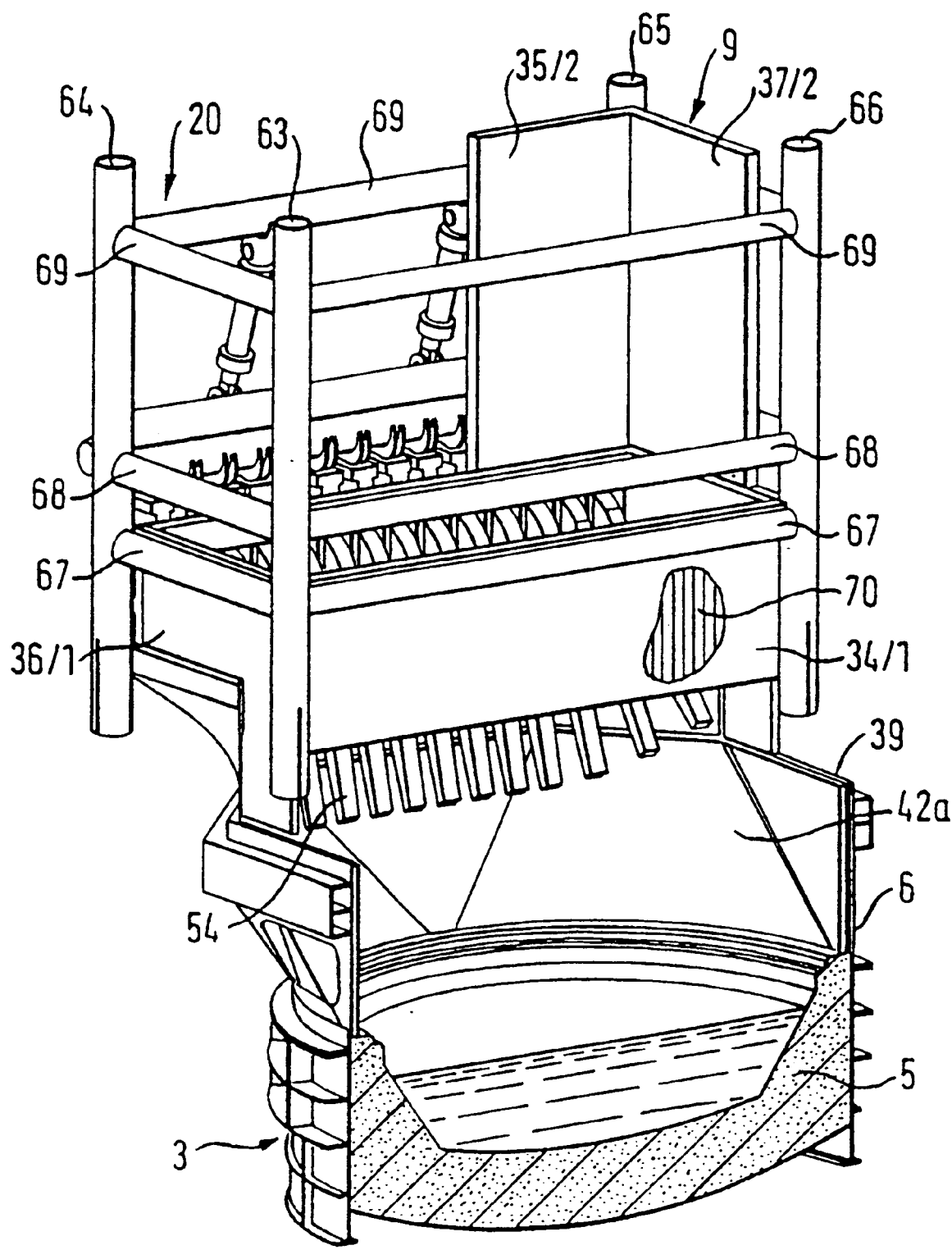

FIGS. 3, 8 and 9 show that the shaft 9 is of rectangular cross-sectional configuration. Preferably, the shaft is rectangular in the lower region when the assembly has retaining members for the feed or charging material, as are described in greater detail hereinafter. Therefore the shaft has shaft walls which are arranged in a rectangular shape at least in its lower region, with a front shaft wall 34 which is adjacent to the chord 18 of the first cover portion 7 when the vessel cover is closed (FIGS. 1, 4 and 5), a rear shaft wall 35 which is remote from the chord 18, and two lateral shaft walls 36 and 37 which connect those walls. In that case, the front shaft wall 34 is of approximately the same length as the chord 18, that is to say the shaft wall 34 adjoins the chord 18, with a narrow cover gap 38. The cover gap is shown on an enlarged scale in FIG. 5.

It should be noted at this point that, in the case of a dome-like vessel cover, as is shown in FIGS. 4 and 5, the chord is only a straight line in plan view but otherwise it is a line following the section of the dome profile, and thus also the lower edge of the front shaft wall 34 is of the same shape.

When the vessel cover is closed, that is to say in the condition shown in FIGS. 1, 4 and 5, the external contour of the vessel cover is formed from the lower edge of the rear shaft wall 35, the lower edge of the two adjoining lateral shaft walls 36 and 37, and the oval part 19, adjoining same, of the first cover portion 7. The upper vessel edge 39, that is to say the upper edge of the upper vessel portion 6, is adapted to that contour. The contour of the upper edge 39 of the vessel thus corresponds to an oval defined by a trapezoidal line (wall sectors 40a, 41a).

The transition from the sectors of the edge of the vessel, which are defined by the trapezoidal line, to the respective sector of the round cross-section of the lower vessel portion is made by a converging wall sector 42a of the upper vessel portion 6 (see FIG. 3).

As already mentioned and as shown in FIG. 5 the first cover portion 7 is separated from the second cover portion 8 by a gap 38 which extends parallel to the chord 18 so that the furnace vessel can be tilted in the direction determined by the furnace cradle, in which there are arranged a tapping hole 43 and a working opening 44, as viewed from the center 11 of the vessel, without that being impeded by the adjoining front wall 34 of the shaft 9. As the second cover portion 8 and therewith the shaft 9 is fixed in a holding arrangement carried by the support structure 26, that is to say not on the furnace cradle, that part of the cover cannot also tilt. It is sufficient however for the lower edge of the shaft to be slightly lifted away from the upper edge 39 of the vessel in order to permit slight tilting movements of the furnace vessel with the first cover portion lying thereon and with the electrodes inserted.

In order to prevent furnace gases from escaping through the gap 38 between the two cover portions, means for sealing off the cover gap 38 are provided at least one of the mutually adjoining edges 45 and 46 respectively of the first and second cover portions.

In the illustrated embodiment, a sealing gas 47 is blown into the gap 38 for sealing purposes. For that purpose, provided along the edge 46, that is to say at the front shaft wall 34, is a duct 13 with a slit-shaped nozzle opening which is towards the cover gap 38, or a row of holes.

In addition, provided at the edge 45 of the first cover portion is a strip arrangement 51 which is formed by cooling tubes and which, when the cover is closed, engages with clearance into a groove.

Preferably the shaft 9 is provided with retaining members 54 (fingers) for the charging material. The kind of retaining members described in WO 95/04910 is particularly suitable for that purpose. Depending on the respective contour of the upper vessel edge 39, 40, 41 and the configuration of the converging wall sector 42 however those retaining members 54 need to be of a special configuration and arrangement.

In the illustrated embodiment, the transition from a rectangular cross-section of the shaft 9 to the round cross-section of the lower vessel portion 5 is formed by way of a polygonal cross-section which in this example follows a trapezoidal line. The transition is already begun above the upper edge 39 of the upper vessel portion insofar as, in the lower shaft portion which is below the retaining members 54, the corners between the shaft walls 35, 36 and 35, 37 are of a configuration such as to converge towards the center of the vessel. The converging shaft wall sectors are identified by references 58 and 59 (see FIG. 3). There are flat surfaces which convert the rectangular cross-section into a cross-sectional profile of the walls 36, 35 and 37, which follows a trapezoidal line and which is then reflected in the profile of the upper vessel edge 39 by straight portions 40a and 41a. The further transition from the contour of the upper vessel edge 39, which in the region below the shaft 9 follows a trapezoidal line, to the round cross-section of the lower vessel portion, is by means of a converging wall sector 42a.

The pivotable fingers 54 are arranged parallel and at a spacing from each other (see FIG. 3) and are mounted in rotary mountings 56 arranged in the frame structure 20 at the rear shaft wall 35. The pivotable fingers 54 are pivotable downwardly from the closed position which is shown in FIG. 5 in solid line and in which the inner portions of the fingers project into the internal space of the shaft and prevent charging material from passing therethrough, into a release position which is shown in dash-dotted line in FIG. 5 and in which the inner portions of the fingers point downwardly and permit the charging material to pass through the shaft. The pivotable fingers 54 are also inclined obliquely downwardly at an angle of about 20° relative to the horizontal, in the closed position.

The fingers 54 which are disposed above the shaft wall sectors 58 and 59 cannot be pivoted downwardly as far as the middle fingers, FIG. 3 shows the release position of the fingers 54 in solid lines, with the closed position in broken lines. It will be seen that three, respective fingers which are adjacent to the shaft walls 36 and 37 and for which the maximum open position is illustrated cannot be pivoted downwardly as far as the central fingers. That presupposes individual actuation of the pivotal movement of those fingers while the central fingers can be pivoted jointly.

Upon the joint downward pivotal movement of the pivotable fingers 54 from the closed position into the release position, the charging material is guided by the pivotable fingers 54 towards the center, that is to say into the round lower vessel portion, so that the wall sector 42 of the upper vessel portion is protected from an excessively great loading.

FIGS. 6 to 9, beside FIG. 5, show further details of the structure and arrangement of the shaft 9.

As is shown in particular by FIGS. 8 and 9 which for the sake of improved understanding reproduce greatly simplified diagrammatic illustrations of the invention, the shaft 9 is fixed in a frame structure 20 which surrounds the shaft in a cage-like configuration. The frame structure 20 includes at the corners four perpendicular tubes 63, 64, 65 and 66 which are welded by horizontal tubes 67, 68 and 69 in a lower, central and upper plane to afford a cage-shaped frame structure 20. The shaft walls 34 to 37 are respectively subdivided into lower shaft wall portions identified by /1 and upper shaft wall portions identified by /2, of which only individual ones are illustrated in the FIGS. FIG. 8 for example only shows the shaft wall portions 34/1, 35/2, 37/1 and 37/2. In that respect moreover the rear shaft wall portion 35/2 is further subdivided in the horizontal direction into three portions of equal width, of which FIGS. 8 and 9 only show the respective shaft wall portion 35/2 adjoining the wall 37. The lower shaft wall portions 34/1 to 37/1 which in this application are identified as first shaft wall portions are designed as fluid-cooled steel wall elements in the form of tubular panels 70. The tubular panels 70 have tube portions which are disposed in mutually juxtaposed relationship and which are connected together at the ends and which extend perpendicularly, that is to say in the direction of movement of the charging material upon filling and emptying of the shaft.

Figure 7:
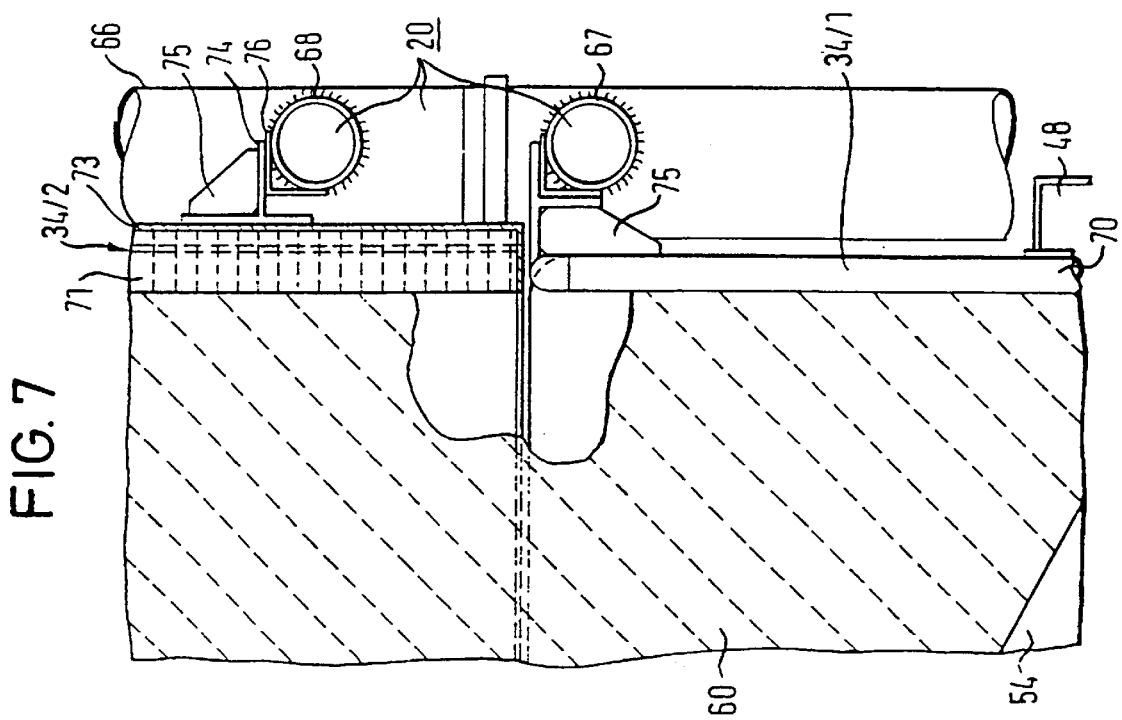
FIG. 7 is a view corresponding to FIG. 6 of a modified shaft wall portion.
Figure 6:
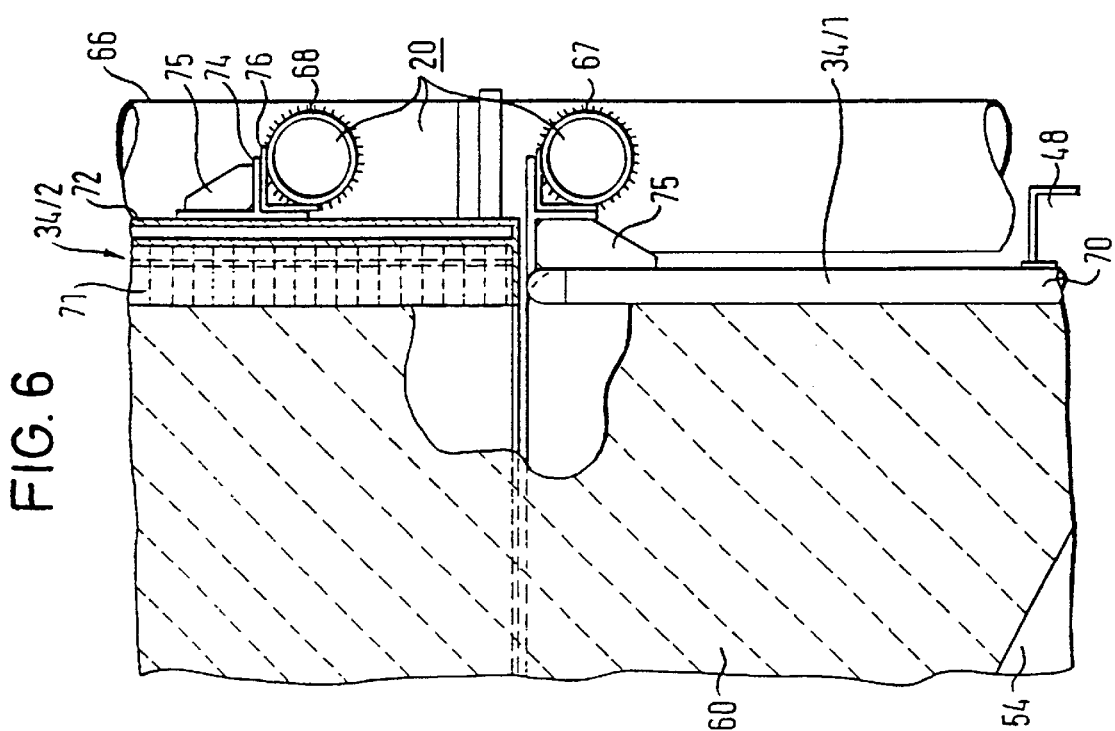
FIG. 6 shows a part on an enlarge scale of FIG. 5 illustrating the fixing of the shaft wall portions in the frame structure.

The upper shaft wall portions 34/2 to 37/2 are in the form of refractory wall elements. On the inside which is towards the receiving space 62 for the charging material 60, they have a layer or plate 71 consisting of refractory material. While the second wall portions 34/2 shown in FIGS. 5 and 6 are formed by refractory wall elements 71 which have a fluid-cooled outside in the form of a cooling box 72, the second shaft wall portion 34/2 illustrated in FIG. 7 is constructed without fluid cooling. The refractory material is introduced into a sheet metal plate member 73 with edges which are angled towards the shaft interior.

In order to be able to change the shaft wall portions quickly, at ,their outside they have angular support surfaces 74 which are mounted on support projections 75 and which are supported on angular co-operating counterpart mountings 76 which are welded to suitable locations of the horizontal tubes 67, 68 and 69 respectively of the frame structure 20. Corresponding, easily releasable fixings which permit fast individual replacement are provided both in relation to the first and also the second wall portions.

In the event of damage to a wall portion, it can be quickly replaced by another wall portion of the same kind, after the shaft has been emptied and moved out. It is desirable for the wall elements, as far as possible, to be standardized in regard to their size and the releasable fixing means thereof in the frame structure, so as to be able to reduce the storage thereof to a minimum. It should be possible for the cooling circuits to be individually taken out of operation.

In regard to the reduction in energy losses it has proven to be advantageous to use cast steel plates at locations subjected to a high level of mechanical loading: the temperature of the cast steel plates, which is detected by at least one temperature sensor, is kept just below the temperature at which deformation of the cast steel plate occurs under the mechanical loading in the charging operation. That temperature is about 800° to 1000° C.

We claim:

1. A charging material preheater for preheating charging material (60) which is to be charged into a furnace vessel (3) having a shaft (9) which is fixed in a frame structure (20) and which in its upper region has a closable feed opening (61) for the changing material (60) and a gas outlet (32) and in its lower region a discharge opening for the charging material (60) and a gas inlet, and shaft walls (32 to 37) that delimit a receiving space (62) for the charging material (60) to be heated, characterized in that at least one of the shaft walls (34 to 37) is subdivided into shaft wall portions (34/1, 34/2 to 37/1, 37/2) which are individually fixed in the frame structure (20) and are individually replaceable.

2. A charging material preheater according to claim 1 characterized in that the shaft walls (32 to 37) define a shaft axis and in that the at least one shaft wall (34, 35) is subdivided in a direction perpendicular to the shaft (9) axis into at least two shaft wall portions (34/1, 34/2; 35/1, 35/2) which are arranged one above the other.

3. A charging material preheater according to claim 1 characterized in that the at least one shaft wall (34, 35) includes at least one shaft wall portion (34/1, 35/1) which is in the form of a steel wall element (70) which can be cooled by a forced cooling apparatus.

4. A charging material preheater according to claim 3 characterized in thatthe steel wall element is in the form of a fluid-cooled tubular panel.

5. A charging material preheater according to claim 4 characterized in that the tubular panel is formed by tube portions which are disposed in mutually juxtaposed relationship and which extended parallel to the direction of movement of the charging material upon filling and emptying of the shaft.

6. A charging material preheater according to claim 3 characterized in that the steel wall element is in the form of a cast steel plate and the temperature of the cast steel plate is controllable by the forced cooling apparatus in dependence on a temperature measurement value of the cast steel plate, which value can be detected by at least one temperature sensor.

7. A charging material preheater according to claim 1 characterized in that the at least one shaft wall (34, 35) includes at least one, second shaft Wall portion (34/2, 3512) which is in the form of a refractory wall element and which, on the inside which is towards the receiving space (62) for the charging material (60), is formed by a layer or plate (71) of refractory material.

8. A charging material preheater according to claim 7 characterized in that the refractory wall element has a fluid-cooled outside (72).

9. A charging material preheater according to claim 7 characterized in that the refractory wall element is formed by a sheet metal plate member (73) with edges which are angled towards tie shaft interior and into which is fitted a refractory lining (71).

10. A charging material preheater according to claim 3 characterized in that the at least one shaft wall (34, 35)

comprises fluid-cooled shaft wall portions which are individually connectable to cooling circuits of the forced cooling apparatus, so that the fluid-cooled shaft wall portions can individually be taken out of operation.

11. A charging material preheater according to claim 1 characterized in that the shaft wall portions (34/1, 3412; 35/1, 35/2) have at their outside support surfaces (74) which are supported on cooperating counterpart mountings (76) of the frame structure (20).

12. A charging material preheater according to claim 1 characterized in that first shaft wall portions (34/1 to 37/1) are provided in the lower region of the shaft (9) and second shaft wall portions (34/2 to 37/2) are provided in the upper region of the shaft.

13. A charging material preheater according to claim 1 characterized in that the frame structure (20) is in the form of a cage structure (63 to 69) which surrounds the shaft walls (34 to 37).

14. A charging material preheater according to claim 3, wherein the shaft (9) has in its lower region retaining members (54, 55) for the charging material to be heated, which are formed by fingers (54) which are arranged parallel and at a spacing from each other and which are mounted in rotary mountings (56) and which are pivotable downwardly from a closed position in which inner portions with inner ends of the fingers (54) project inclinedly downwardly into the interior of the shaft to block the passage of charging material therethrough, into a release position in which said portions of the fingers (54) point downwardly and release the charging material to pass trough, characterized in that the shaft wall (34) which is located opposite to the inner ends of the fingers, when the fingers project into the interior of the shaft to block the passage of charging material, includes one or more first shaft wall portions in the region which is subjected to a particular mechanical loading due to the resilient return movement of the fingers en the shaft is loaded.

15. A smelting unit having an are furnace (1) which includes the furnace vessel (3) with a vessel cover (4) comprising fist and second cover portions (7, 8) of which the first cover portion (7) includes at least one electrode opening (14) for the introduction of an electrode (12) and the second cover portion (8) includes the shaft (9) which is fixed in a holding arrangement (21), characterized in that the shaft (9) is constructed according to claim 1 and the holding arrangement (21) and the vessel (3) are displaceable horizontally relative to each other.

16. A smelting unit according to claim 15 characterized in that the frame structure (20) carrying the shaft (9) in such a way that it can be raised and lowered in the holding arrangement (21).

17. A charging material preheater according to claim 1 characterized in that the charging material which is to be charged into the furnace vessel is metal scrap.

* * * * *

UNITED STATES PATENT AND TRADEMARK OFFICE
CERTIFICATE OF CORRECTION

PATENT NO. : 6,404,800 B1
DATED : June 11, 2002
INVENTOR(S) : Gerhard Fuchs

It is certified that error appears in the above-identified patent and that said Letters Patent is hereby corrected as shown below:

<u>Column 8,</u>
Line 16, replace "changing" with -- charging --
Line 36, replace "thatthe" with -- that the --
Line 41, replace "which extended" with -- which extend --
Line 64, replace "tie" with -- the --

Signed and Sealed this

Fourth Day of February, 2003

JAMES E. ROGAN
*Director of the United States Patent and Trademark Office*